(12) United States Patent
Boudville

(10) Patent No.: US 8,532,632 B2
(45) Date of Patent: Sep. 10, 2013

(54) CELLPHONE CHANGING AN ELECTRONIC DISPLAY THAT CONTAINS A BARCODE

(76) Inventor: Wesley Boudville, Perth (AU)

( * ) Notice: Subject to any disclaimer, the term of this patent is extended or adjusted under 35 U.S.C. 154(b) by 150 days.

(21) Appl. No.: 13/068,782

(22) Filed: May 16, 2011

(65) Prior Publication Data

US 2012/0295591 A1    Nov. 22, 2012

(51) Int. Cl.
*H04M 3/42*    (2006.01)

(52) U.S. Cl.
USPC .............. 455/414.1; 455/556.2; 705/14.73

(58) Field of Classification Search
USPC .............. 455/556.2, 414.1; 705/14.73, 12, 705/26.61; 715/771; 709/202
See application file for complete search history.

(56) References Cited

U.S. PATENT DOCUMENTS

| | | | |
|---|---|---|---|
| 6,115,508 A | 9/2000 | Lopresti | |
| 6,631,012 B2 | 10/2003 | Athens | |
| 7,478,746 B2 | 1/2009 | Cattrone | |
| 2001/0051915 A1 | 12/2001 | Ueno | |
| 2007/0125861 A1 | 6/2007 | Shoobridge | |
| 2010/0116888 A1* | 5/2010 | Asami | 235/454 |
| 2010/0260373 A1 | 10/2010 | Neven | |
| 2011/0000958 A1 | 1/2011 | Herzig | |
| 2011/0082747 A1 | 4/2011 | Khan | |
| 2011/0106635 A1 | 5/2011 | Khan | |
| 2012/0311623 A1* | 12/2012 | Davis et al. | 725/18 |

FOREIGN PATENT DOCUMENTS

JP    2008-005125 A    3/2008

OTHER PUBLICATIONS

PCT Report of Examination of U.S. Appl. No. 13/068,782 by KIPO.
English translation of abstract of Japanese invention JP2008-065125.

* cited by examiner

*Primary Examiner* — Phouc Doan
(74) *Attorney, Agent, or Firm* — Steinfl & Bruno

(57) ABSTRACT

A cellphone with a camera takes a photo of a barcode in a screen that can show different images. The barcode is decoded into a URL, and the cellphone uses wireless Internet access to visit the website of the URL. The website then makes a different image, that also has a barcode of a URL, and sends it to the screen for display. This can increase the interactivity of the screen and its value to advertisers. Several users with cellphones might simultaneously interact with the screen in this manner.

22 Claims, 2 Drawing Sheets

CELLPHONE CHANGING AN ELECTRONIC DISPLAY THAT CONTAINS A BARCODE

REFERENCES CITED

"Bluetooth Essentials for Programmers" by A. Huang and L. Rudolph, Cambridge (2007), 0521-703751.
"Barcodes for Mobile Devices" by H. Kato et al, Cambridge (2010), 978-0521-888394.
"The Bar Code Book" by R. Palmer, 5$^{th}$ edition, Trafford (2007), 1425-133746.
"Two-dimensional color barcode and method of generating and decoding the same" by P. Cattrone, U.S. Pat. No. 7,478,746 (2009).
"Apparatus and method for printing two-dimensional barcode and articles incorporating such barcode" by G. Athens et al, U.S. Pat. No. 6,631,012 (2003).
"Clock free two-dimensional barcode and method for printing and reading the same" by D. Lopresti et al, U.S. Pat. No. 6,115,508 (2000).
"Three dimensional barcode" by R. Shoobridge, US Patent application 20070125861 (2007).
"Data transfer system using mobile terminal and two-dimensional barcode" by T. Ueno et al, US Patent application 20010051915 (2001).
[The Web references are as of May 2011.]
bit.ly
wikipedia.org/wiki/Barcode
wikipedia.org/wiki/Qr_code

TECHNICAL FIELD

The invention relates to the use of a cellphone to read and change an electronic display.

BACKGROUND

One and two dimensional barcodes are now in common use. The two dimensional barcode in particular has seen popular deployment in signs posted at various locations. A common encoding is the use of the QR code.

Typically, the 2d barcode encodes a URL. A common usage is for a user with a cellphone that has a camera to take a picture of the 2d barcode. Software on the cellphone decodes this to the URL. If the cellphone has (wireless) Internet access, it then goes out on the Internet to that address and downloads the webpage and displays it on the cellphone, in a browser. Whereby the user can interact with it as a standard webpage.

A barcode is preferred over the display of the URL in human readable text, because the latter needs the mobile user to read it and type it into her cellphone browser. The small size of the cellphone screen and the awkwardness of typing letters on the cellphone make the input of the URL error prone.

Hitherto, it appears that from the granted patents and patents pending, as well as general knowledge of the state of the art, that such displays of 2d barcodes are usually in permanent form. For example, printed on a poster or piece of paper.

SUMMARY

A cellphone with a camera takes a photo of a barcode in a screen that can show different images. The barcode is decoded into a URL, and the cellphone uses wireless Internet access to visit the website of the URL. The website then makes a different image, that also has a barcode of a URL, and sends it to the screen for display. This can increase the interactivity of the screen and its value to advertisers. Several users with cellphones might simultaneously interact with the screen in this manner.

DETAILED DESCRIPTION OF THE PREFERRED EMBODIMENT

What we claim as new and desire to secure by letters patent is set forth in the following claims.

Figure 1:
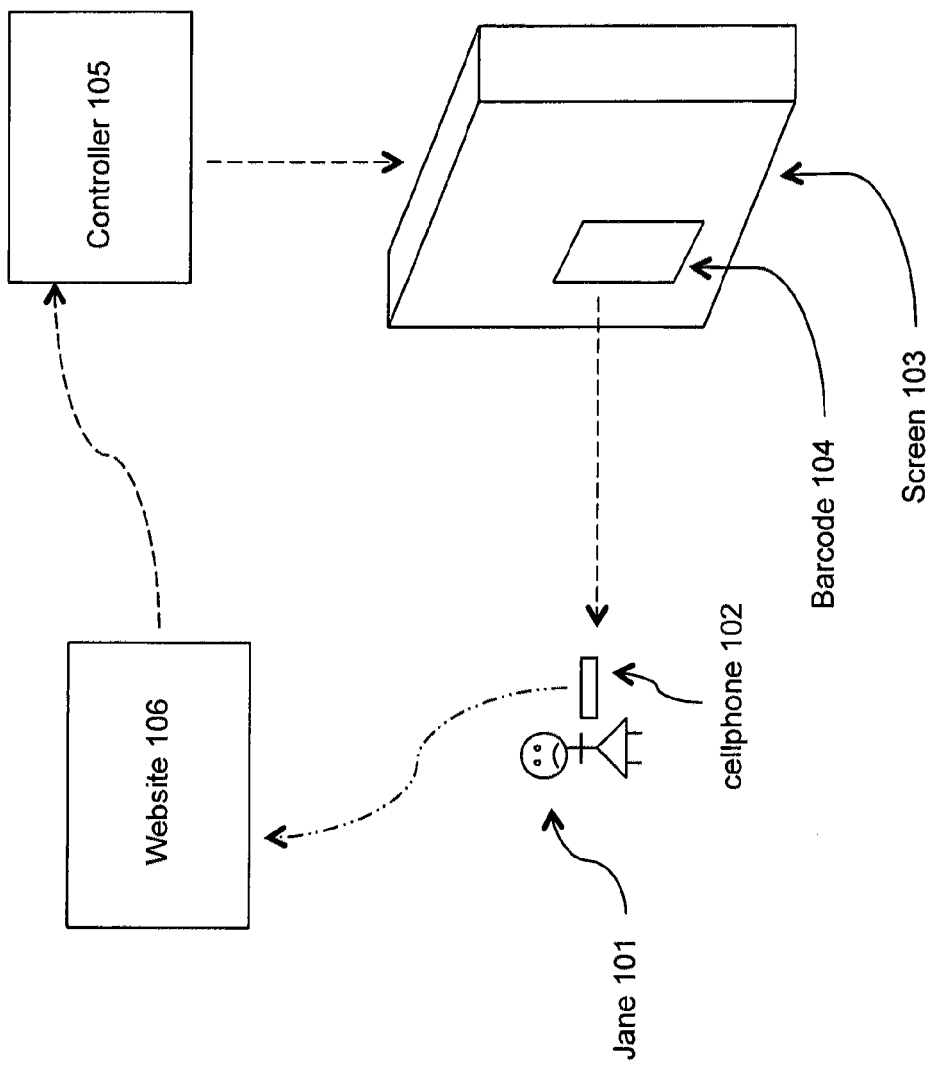
FIG. 1 shows Jane using her cellphone to read and change the screen display.

Let Jane be a user with a cellphone that has a camera. FIG. 1 shows Jane 101 using her cellphone 102. She is near Screen 103. This is an electronic screen that shows an image. The screen is controlled by Controller 105. The latter is a computer, or contains a computer, that sends various control commands to Screen 103, including the image to be shown. Often, Controller 105 is in close proximity with Screen 103. It might communicate with Screen 103 by wired or wireless means. Or, in another implementation, Controller 105 and Screen 103 might be combined into one device; akin to a personal computer and its screen.

Screen 103 can be an active or passive display. Active means that it illuminates its image, so that the latter can be seen without an external light source. Light comes from the image. Passive means that the image elements absorb and reflect incident light from an external source to form an image seen by Jane.

Screen 103 shows some image, where this includes Barcode 104. This is typically a 2 dimensional barcode. Often, the rest of the image can be something of semantic meaning to Jane. (Though a degenerate case is where the image only consists of Barcode 104.) The meaning induces her to point the camera of the cellphone at Barcode 104 and take a picture.

The cellphone has software that decodes the image into a URL. The cellphone is assumed to have wireless access to the Internet, such that it goes to the URL address, which is at Website 106, and downloads the webpage at that address and displays it in the cellphone's screen, possibly in a web browser. Between cellphone 102 and Website 106 are several machines, like those of the cellphone network and, once the signal goes on the Internet, various Internet routers. These are omitted for clarity, because they can be considered to just passively pass the signal through, and do not take an active role in this invention.

The steps in the previous paragraph are well established state of the art.

In this invention, Website 106 instead of or in addition to replying to cellphone 102 with a webpage, now sends a signal to Controller 105. The latter then makes a change in the image on Screen 103.

There might be various relay machines between Website 106 and Controller 105. These are omitted for clarity, as they do not take an active role in this invention.

One variation on the previous steps is where Website 106 first sends a webpage to cellphone 102. Jane might take various actions based on that webpage, like what links she might click or what values she might enter into a form, that go back to Website 106. Then, using that feedback, the website builds an image that goes to Controller 105 and then to Screen 103.

To some extent, the division between Website 106 and Controller 105 is arbitrary. One extreme is there to be no Controller 105, so that Website 106 directly controls Screen 103. We imagine the existence of Controller 105 to account for a likely case where Website 106 is the master controller of many screens, where the latter could be distributed over a wide region. Here, each Controller 105 might be a simple machine co-located with its Screen 103. In one limit, Controller 105 merges with Screen 103. In part, the existence of Controller 105 gives some redundancy, so that if Website 106 is unavailable, the various controllers can perhaps still show images on their screens, and so possess some residual advertising or informational value.

The change in the image on Screen 103 due to Jane going to Website 106 can be as arbitrary as any possible image that could be shown on Screen 103, and for any reason.

One simple example is where Screen 103 shows a text and counter, like "The number of visitors=" and followed by the value of the counter, along with the requisite barcode. When Jane's cellphone goes to Website 106, this constitutes another visit to that website and the counter increments inside the website's memory and the resultant image value is updated on Screen 103. We cite this example as a pedagogic proof of concept.

This corresponds to the early development of the Web in the mid 1990s, when this was a common example of a program, so that new users and programmers of the Web could gain some familiarity.

Note that any change of the image on Screen 103 due to Jane's actions need not be deterministic. Some implementations (e.g. some games) might deliberately introduce stochastic elements.

One special degenerate case is where Jane's actions might not cause any change of the image. This could occasionally happen.

Another case is to recall that Jane represents one particular user at a given screen. There might be other users at other screens, with the screens under the ultimate control of Website 106. So, for example, the joint actions of these users in hitting the website might produce images on the screens that are a function of those multiple actions. And where different screens might have different images.

There might also be multiple users near a given Screen 103. They might in some time period hit Website 106, which might pool their actions and output an image to Screen 103 that is a function of those actions.

The previous 2 paragraphs could be combined, so that we have multiple users at each of several screens.

This invention differs from other ideas using bidirectional interaction between cellphone 102 and Screen 103.

Suggestions have included the use of infrared, Bluetooth or Near Field Communication. All these involve the deployment of some type of receiver or transceiver on, in or near Screen 103, and associated with that screen.

In contrast, the overall unidirectional flow of information in this invention is indicated by the dashed arrows of FIG. 1. We say overall, because earlier we indicated the possibility that Website 106 might return a webpage to cellphone 102, and when Jane does something on that page and returns her results to Website 106, then the latter makes an image. With this caveat, it can be seen that the overall flow is largely unidirectional. But the main point about the unidirectionality is that it holds true in the interaction between Screen 103 and cellphone 102.

Another difference is that those other ideas using bidirectional interaction might not have an image that can be varied. The simplest case is where the screen is a billboard with a fixed poster on it, and the billboard has a transceiver that interacts with the cellphone.

Consider again the case where Website 106 returns a webpage to cellphone 102, where Jane can do some actions on it and return the results to the website. Naively, the website need not insert any barcodes into future images that it sends to the screen. Since in principle it can now interact directly with Jane using her cellphone.

There are 2 drawbacks. The first is that suppose Jane does not upload any changes to her webpage. Then no one else with a cellphone can change the screen. This might not be seen as desirable by the website. This could be overcome by the website updating the screen with a barcode if Jane does not respond within a given time.

The second drawback is if Jane walks away from the screen. But she can still control it via her cellphone. This may not be desirable, because a major feature about the screen is that it can be controlled by people within its line of sight.

It might be seen that the second drawback is the more serious problem.

The unidirectional nature of this invention reduces the cost of the screen, because there is no transceiver. So there is less upfront hardware cost. The ongoing maintenance cost is also less, because there is no transceiver to fail or degrade. This can be nontrivial. Screens might be deployed in outdoor conditions, partially exposed to inclement weather, and also to the risk of vandalism or accident. And each screen needs its own receiver or transceiver.

We also contrast our method with the bidirectional possibility of the screen having hardware buttons on it, outside the display area. Our method does not prohibit this, but does not require it. A disadvantage of the buttons is that these are extra hardware, and hence extra cost. Another is that letting a generic user be able to press them might not be optimal. This exposes the buttons to vandalism. Plus, if the buttons are near the display area, then that is also exposed to vandalism.

One scenario for the preferred deployment of the screen is where it is physically out of reach of users. An analogy might be the overhead televisions in sports bars. If remote controls are then used, instead of buttons, to control the screen, then issues of losing the controls, or having them damaged, arise.

Related to the discussion about buttons is the possibility of the screen having haptic (touch) ability. So that perhaps a user could touch part or parts of the screen as feedback that could, in part, change the image. Our above remarks about possibly having to protect the screen from damage apply here. Plus, the current implementation of touch screens is mostly in cellphones and some computer displays. It is relatively expensive to it, especially over all of a large screen.

Hence one way to regard this invention is that it factors out the possibility of using transceiver hardware on each screen and replaces these with possibly more computational and bandwidth requirements at a central website (Website 106). The latter can be upgraded as needs arise. Whereas alternatives that use extra hardware on screens need all those screens upgraded, which can be more expensive.

Because the invention has minimal requirements on the screen, then it allows the deployment of the invention onto the usage of many existing electronic displays.

This invention also requires less specific hardware requirements on the cellphone, other than it has a camera. To implement the alternatives would require both the cellphone manufacturers and the makers of the screens to decide which bidirectional method to support. Competing choices can make this a hard business risk. Putting multiple transceivers on a screen increases its cost. While multiple transceivers on a cellphone is possible but difficult, due to the severe space constraints.

In this invention, the software on the cellphone that decodes the barcode image can be imagined to be possibly downloaded onto the cellphone, or come preinstalled.

One possible restriction in this invention is where there might be several barcoding standards. An answer is that the cellphone could have decoding software that can decode the most common types of barcodes.

This invention takes advantage of 2 popular trends with cellphones. The first is that many have cameras; especially for cellphones in developed countries. The second is that Internet access is increasingly common, including with the so-called smartphones.

One usage of this invention could be to induce greater interaction between Jane and the advertising display on Screen 103. If she can cause a change in the display, this involvement ability and possible entertainment value to her and others nearby, might cause her to linger near and continue to interact with the screen. It could also cause the other observers to stay and watch the screen, or also to interact using their cellphones.

Somewhat akin to a television viewer continuing to watch the television and its attendant commercials, or a person using a web browser staying at a website. Except that the current invention affords a multiperson or multiplayer interactivity that might be more compelling.

Figure 2:
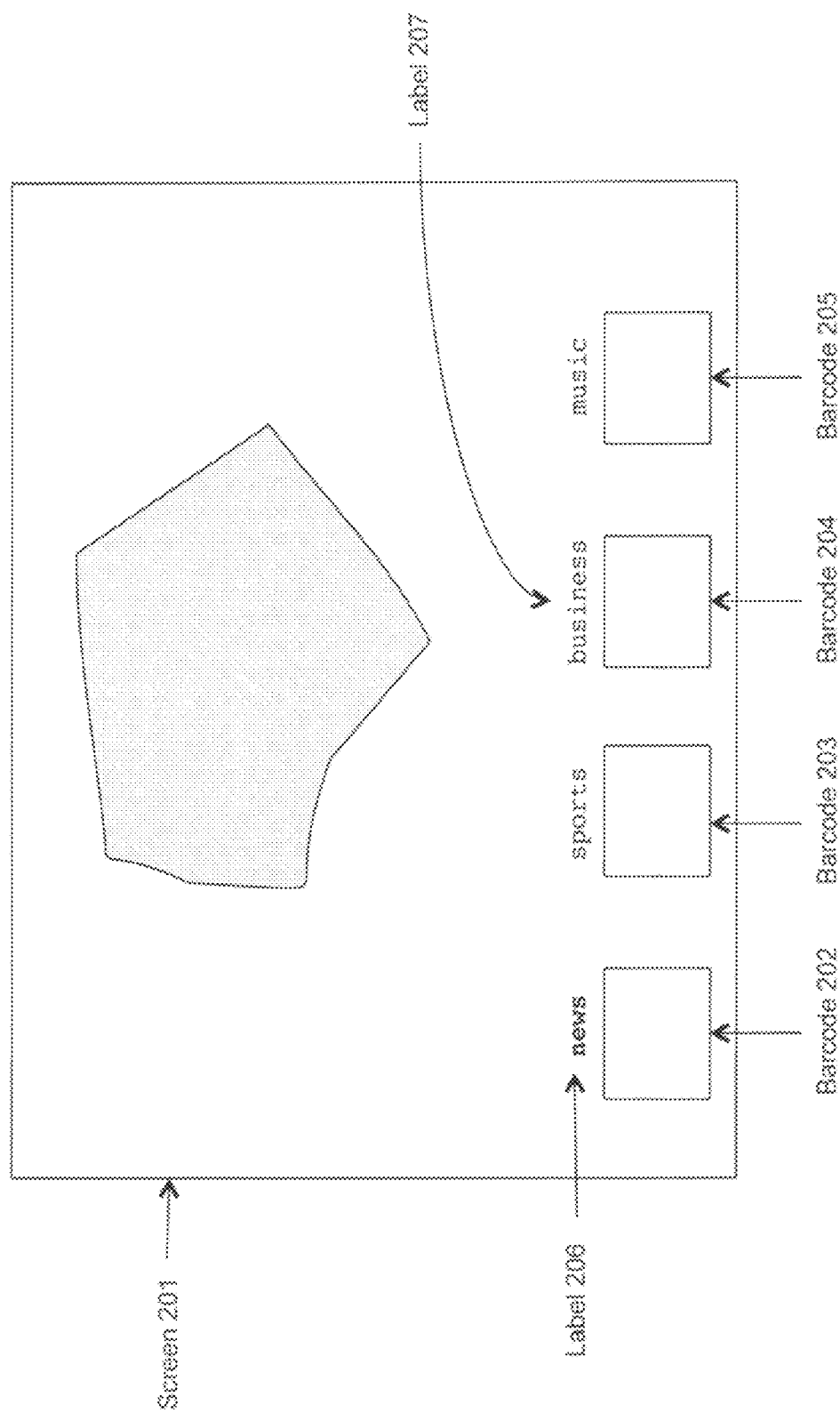
FIG. 2 shows a screen with an image and 4 barcodes and labels.

FIG. 2 shows an example of usage. We are looking directly at Screen 201 (which corresponds to Screen 103 in FIG. 1). There is some image in the center of the screen. This could be a static image or video, depending on the screen's functionality. Across the bottom are 4 barcodes, Barcode 202, Barcode 203, Barcode 204 and Barcode 205. Above each barcode is text telling of the choices available to Jane for changing what is shown. One of these labels, Label 206, is in bold compared to the other labels, indicating that this is the current type of information being shown. If Jane wants to change to 'business', she would use her cellphone to take a picture of Barcode 204, which is under Label 207 and transmit it to Website 106. Whereupon, possibly with some delay, instituted in part perhaps by hardware and communication limitations, the main image would change, Label 206 would not be in bold, and Label 207 would now be in bold.

Many elaborations on FIG. 2 are possible. For example, suppose the screen is showing video clips, and it is not considered desirable to change to another video before the current one has ended. Then during the play of the current video, the barcodes might not be shown, or they might be shown in some greyed out manner, to suggest to Jane that they cannot be clicked. Here, if enough contrast exists in the greyed out images, and Jane were indeed to take a photo and her software is able to generate the correct URL, then when Website 106 gets this, it might not do anything until the current video has ended.

Another variant is where the barcodes are all selectable during the playing of the current video. But the barcodes are used to allow voting by people with cellphones near the screen. By assuming for example that when each phone accesses the Internet, to post its vote to Website 106, that it has a unique IP address. So Website 106 might allow only one vote per IP address, and count up the votes it gets in each category. When the current video ends, the category with the most votes determines what is shown next.

A variant on the previous paragraph is where during the voting during the playing of the current video, the number of votes in each category might also be shown near the corresponding barcodes.

Another variant of FIG. 2 could be a 2 person game, where both players (Sue and Bob) have the necessary cellphones. Imagine at the bottom of FIG. 2 that Barcodes 202 and 203 are allocated to Sue and Barcodes 204 and 205 are for Bob. In some setup steps, they have used their cellphones to register for this game, and Website 106 allocates the barcodes to each. So only Sue can click on Barcodes 202 and 203. If Bob clicks on either of these, it could be ignored by the website, or a penalty might be levied on him, depending on the game. Analogous conditions could be put on Barcodes 204 and 205. The game might be a series of questions posted in video on the main part of the screen, possibly accompanied by audio if the screen can play audio. The questions might have the only possible answers of yes and no. The label above Barcode 202 might be 'yes', and the label above Barcode 203 might be 'no'. Likewise for Barcodes 204 and 205.

Of course, there might be more than 2 barcodes per player. But a practical limitation could be the resolving power of the typical cellphone, at the typical distance that the player would be from the screen.

A variant on the game might be that all the barcodes are clickable by all players. Perhaps the intent is to be the first player to click on the correct barcode.

It can be seen that the above types of games are limited compared to multiplayer games using game consoles. But those need dedicated hardware distributed to the players. The current invention uses generic cellphones.
==========================

Overall Extensions

One extension is that the software that decodes the barcode into a URL resides not in the cellphone but in a server machine accessible over the wireless phone network.

One extension is that instead of a cellphone, Jane might have another portable device that has a camera and software to decode a barcode into a URL. This might be a laptop or netbook or electronic book reader or tablet, for example.

One extension is that while the above discussion was about a 2 dimensional barcode, the steps also pertain to a 3 dimensional or 1 dimensional barcode. The latter is somewhat unlikely because of the low encoding capacity, but we include it for completeness.

Above, when we discussed how Screen 103 can change, this can also include a change in Barcode 104. So, for example, the action by Jane in visiting a particular Website 106 could lead to another website's URL being encoded in the update of Screen 103.

Another extension is where, instead of Jane taking a picture of Barcode 104 based on what she sees in the rest of the image in Screen 103, she is motivated in part or entirely by information she has earlier seen elsewhere. This might include, for example, an ad on television or on the Web, that says that if she goes to some area, and sees a particular image on such a screen, she should scan its barcode and go to its URL, to try to win a prize.

Another extension is where in Website 106 of FIG. 1, there might be manual input by personnel at the website, along with the inputs from the users with cellphones, that determines the instructions sent to Controller 105.

One remark concerns URL shortening. It stems from the observation that at the cellphone's camera, the physical distance from the barcode is likely not the main consideration. Instead, the solid angle subtended by the barcode at the camera could be more significant. This and the resolution of the image taken by the camera could be a constraint on how much detail can be read from the barcode.

There are various barcode algorithms, and for some of these, there might be different implementations, where the difference mainly affects how much information can be encoded. It could be desirable to have a low resolution implementation, to make it easier for the user's camera to read it at a distance. This differs from some current usages of 2d barcodes, like where they are printed in a magazine page and the user is within arm's length of the page.

But a low resolution implementation means a lower maximum on the information encoded and thus a shorter URL. In another context, of Short Message System (SMS), there is a 140 character maximum on URLs that are sent inside an SMS message. The maximum in this invention would depend on the encoding. However, the idea of URL shortening websites, like bit.ly, can be used here. Website 106 might establish another website, with a short name, and the encodings of URLs could point to that, which would then redirect to Website 106. Or Website 106 might use an established URL shortening website.

The barcode might be positioned on the part of the screen that is likely closest to most users. For example, for a large screen in an overhead display, the closest part is the bottom of the screen. So barcodes might preferentially be put there in the image.

Initially when a given screen is being set up, there might be a calibration step, possibly using manual input. This involves determining the distances and locations where typical or preferred viewers of the screen will be located. Note that they might be sitting, standing, moving or some combination of these. Also, estimates could be made of the typical image sizes and resolving power of the cameras in the average cellphones of those viewers. From these, estimates can be made of the optimal resolutions, sizes and locations on the screen of barcodes likely to be accurately recorded by the cellphones of those visitors. These 3 factors will probably be related.

The results can be sent to Website 106. It can record these for each screen that it drives. So that when it sends an image, it can usefully pick a barcode likely to be correctly decoded by the viewers' cellphones.

I claim:

1. A system comprising:
   a controller adapted to retrieve images from a website;
   at least one monitor adapted to display images from the website and one or more barcodes according to instructions received from the controller, the one or more barcodes comprising encoded uniform resource locators (URLs); and
   at least one electronic computing device having Internet access comprising:
      a camera adapted to scan the one or more barcodes;
      a software adapted to decode each of the one or more barcodes scanned with the camera, and adapted to retrieve information from the website directed by the URL obtained from the barcode; and
      a screen adapted to display the retrieved website.

2. The system according to claim 1, wherein the at least one electronic computing device is configured to receive inputs from a user, and configured to send information to the website according to inputs from the user.

3. The system according to claim 2, wherein the controller is configured to update the images and instructions to be displayed on the at least one monitor.

4. The system according to claim 2, wherein the website is configured to receive and process information from a plurality of the at least one or more electronic computing device.

5. The system according to claim 4, further comprising a plurality of the at least one monitor, each of the plurality of the at least one monitor displaying a different image from each other.

6. The system according to claim 2, wherein the website is configured to accept the input from a particular network address of the user one time.

7. The system according to claim 1, wherein the at least one electronic computing device is selected from the group consisting of: a cellphone, a smartphone, a digital camera, a laptop, a netbook, an electronic book reader, and a tablet.

8. The system according to claim 1, wherein each of the one or more barcodes corresponds to a different URL or response.

9. The system according to claim 1, wherein the website pre-records optimal resolutions, sizes and locations of the at least one monitor determined by information pertaining to preferred locations by the users.

10. The system according to claim 1, wherein the monitor is located such that the monitor is physically untouchable and/or unreachable by the user.

11. The system according to claim 1, wherein the monitor is an electronic billboard or an overhead screen.

12. The system according to claim 1, wherein the monitor displays advertisements.

13. The system according to claim 1, wherein an interaction between the user and the at least one monitor is a single player game or a multiplayer game.

14. An interactive method comprising:
   providing a monitor for displaying images from a website and one or more barcodes according to instructions received from a controller, the one or more barcodes comprising an encoded uniform resource locator (URL);
   providing an electronic computing device having an Internet access;
   scanning the barcode provided on the monitor with the electronic computing device;
   decoding the scanned barcode with a decoding software on the electronic computing device;
   accessing a website according to the URL decoded from the barcode;
   sending inputs, by the user, from the electronic computing device to the website; and
   updating, by the controller, the images and/or the one or more barcodes on the monitor according to inputs by the user.

15. The method according to claim 14, wherein the electronic computing device is selected from the group consisting of: a cellphone, a smartphone, a digital camera, a laptop, a netbook, an electronic book reader, and a tablet.

16. The method according to claim 14, wherein each of the one or more barcodes corresponds to a different URL or response.

17. The method according to claim 14, wherein the website is configured to receive and process information from a plurality the electronic computing device.

18. The method according to claim 14, wherein the monitor is located such the monitor is physically untouchable and/or unreachable by the user.

19. The method according to claim 14, wherein the monitor is an electronic billboard or an overhead screen.

20. The method according to claim 14, wherein the website is configured to accept the input from a particular network address of the user one time.

21. The method according to claim 14, wherein the monitor displays advertisements.

22. The method according to claim 14, wherein the interactive method is a single player game or a multiplayer game.

* * * * *